(12) United States Patent
Winsor

(10) Patent No.: US 7,475,668 B2
(45) Date of Patent: Jan. 13, 2009

(54) SPARK IGNITION TO COMPRESSION IGNITION TRANSITION IN AN INTERNAL COMBUSTION ENGINE

(75) Inventor: Richard Edward Winsor, Waterloo, IA (US)

(73) Assignee: Deere & Company, Moline, IL (US)

( * ) Notice: Subject to any disclaimer, the term of this patent is extended or adjusted under 35 U.S.C. 154(b) by 118 days.

(21) Appl. No.: 11/340,155

(22) Filed: Jan. 26, 2006

(65) Prior Publication Data

US 2007/0169745 A1   Jul. 26, 2007

(51) Int. Cl.
  F02B 17/00 (2006.01)
  F02B 1/12 (2006.01)
  F02B 5/00 (2006.01)
  F02P 5/00 (2006.01)
  F02M 7/00 (2006.01)

(52) U.S. Cl. ............ 123/295; 123/27 R; 123/305; 123/406.21; 123/435; 60/601

(58) Field of Classification Search ............ 123/295, 123/27 R, 299, 527, 435, 305, 525, 595, 406.37, 123/406.21, 406.14, 406.32; 701/111, 110, 701/114, 104, 107; 60/601
See application file for complete search history.

(56) References Cited

U.S. PATENT DOCUMENTS

| | | | | |
|---|---|---|---|---|
| 4,619,236 A | * | 10/1986 | Okada et al. ............ 123/435 |
| 4,716,874 A | * | 1/1988 | Hilliard et al. ......... 123/406.14 |
| 4,898,139 A | * | 2/1990 | Kitayama et al. ....... 123/406.32 |
| 5,421,303 A | * | 6/1995 | Georgas ................... 123/595 |
| 6,247,448 B1 | * | 6/2001 | Scholl et al. ........... 123/406.21 |
| 6,354,268 B1 | * | 3/2002 | Beck et al. .............. 123/435 |
| 6,371,092 B1 | * | 4/2002 | Guglielmo et al. ........ 123/527 |
| 6,456,927 B1 | * | 9/2002 | Frankowski et al. .... 123/406.37 |
| 6,550,430 B2 | * | 4/2003 | Gray ....................... 123/525 |
| 6,561,157 B2 | | 5/2003 | zur Loye et al. ......... 123/295 |
| 6,619,255 B2 | * | 9/2003 | Urushihara et al. ....... 123/299 |
| 6,651,615 B2 | * | 11/2003 | Suzuki et al. ............. 123/305 |
| 6,659,071 B2 | * | 12/2003 | LaPointe et al. .......... 123/299 |
| 6,684,849 B2 | | 2/2004 | zur Loye et al. ......... 123/295 |
| 6,752,104 B2 | | 6/2004 | Fiveland et al. .......... 123/27 R |
| 6,907,870 B2 | | 6/2005 | zur Loye et al. ......... 123/27 R |
| 6,945,229 B1 | * | 9/2005 | Zhu et al. ............. 123/406.37 |
| 6,947,830 B1 | * | 9/2005 | Froloff et al. .............. 701/111 |
| 7,007,669 B1 | * | 3/2006 | Willi et al. ................ 123/305 |
| 7,089,912 B2 | * | 8/2006 | Koopmans ............. 123/406.45 |
| 7,213,566 B1 | * | 5/2007 | Jankovic et al. ........... 123/305 |
| 7,213,585 B2 | * | 5/2007 | Yang ........................ 123/435 |
| 7,222,606 B2 | * | 5/2007 | Yoshino et al. ........ 123/406.37 |
| 2004/0182359 A1 | * | 9/2004 | Stewart et al. ............ 123/295 |
| 2006/0213193 A1 | * | 9/2006 | Koopmans ................. 60/601 |
| 2006/0272616 A1 | * | 12/2006 | Kuzuyama ................ 123/435 |

* cited by examiner

Primary Examiner—Thai-Ba Trieu

(57) ABSTRACT

A method of operating an internal combustion engine includes the steps of: igniting a diesel fuel and air mixture in a combustion cylinder using spark ignition; sensing knock in the combustion cylinder; adjusting a spark timing and a fuel injection amount in the combustion cylinder dependent upon the sensed knock; and igniting the diesel fuel and air mixture in the combustion cylinder using compression ignition.

21 Claims, 3 Drawing Sheets

SPARK IGNITION TO COMPRESSION IGNITION TRANSITION IN AN INTERNAL COMBUSTION ENGINE

FIELD OF THE INVENTION

The present invention relates to internal combustion engines, and, more particularly, to internal combustion engines operated using homogenous charge compression ignition.

BACKGROUND OF THE INVENTION

Internal combustion (IC) engines are typically operated using spark ignition or compression ignition. With spark ignition, a mixture of fuel and air is introduced into a combustion cylinder and compressed. A spark plug initiates combustion through the creation of an open spark sufficient to ignite the air and fuel mixture in the cylinder. With compression ignition, fuel is injected into the combustion chamber and the heat generated during compression causes the fuel and air mixture to ignite.

Increasingly restrictive engine emission standards have caused more efficient engine operation and reduced emissions from such engines. Homogenous charge compression ignition (HCCI) may result in significant emission reductions. This same process is also known by the names PCI, PCCI and CAI, which stand for Premixed Compression Ignition, Premixed Charge Compression Ignition, and Controlled Auto-Ignition, respectively. In an engine operating under HCCI, the fuel is introduced into the cylinder earlier in the compression cycle than is typical. The air and fuel are intimately mixed, typically at a high air/fuel ratio or with considerable exhaust gas recirculation (EGR), before compression in the combustion cylinder. As compression occurs, the air temperature increases, and ultimately combustion is initiated at numerous locations throughout the cylinder, as the fuel droplets auto-ignite from the heat of the surrounding air. Typically, combustion occurs at lower temperatures leading to reduced noxious oxides (NOx) emissions.

The use of HCCI has apparent benefits in substantial reduction of NOx emissions. However, difficulties have been encountered in implementing HCCI. Fuel preparation is important for peak operating performance of an HCCI engine. The air/fuel mixture must be intimately and thoroughly mixed. Preferably, fuel breakup occurs early in the compression cycle, allowing for intimate mixture of the air and fuel. It is desirable to create droplets of fuel as small as possible in a combustion cylinder operating under HCCI concepts. High pressure injection of the fuel can be used to create surface instabilities on the fuel droplets, causing the fuel spray to breakup and disperse.

In addition to the problem of control of HCCI combustion, there is the problem of starting the engine and warming it up to arrive at a state with stable HCCI combustion. With a cold engine, HCCI combustion is very difficult to achieve and would require heating the air, obtaining very high compression ratio, or using a very easily ignited fuel or additive. The starting and warm up of an engine (whether diesel, spark-ignition, or HCCI) is affected by the ease with which the fuel can be ignited and its volatility.

SUMMARY OF THE INVENTION

The invention comprises, in one form thereof, a method of operating an internal combustion engine, including the steps of: igniting a diesel fuel and air mixture in a combustion cylinder using spark ignition; sensing knock in the combustion cylinder; adjusting a spark timing and a fuel injection amount in the combustion cylinder dependent upon the sensed knock; and igniting the diesel fuel and air mixture in the combustion cylinder using compression ignition.

The invention comprises, in another form thereof, a method of operating an internal combustion engine, including the steps of: igniting a diesel fuel and air mixture in a plurality of combustion cylinders using spark ignition; sensing knock independently in each combustion cylinder; adjusting a spark timing and a fuel injection amount independently in each combustion cylinder, dependent upon the sensed knock in that combustion cylinder; as the engine warms up, igniting the diesel fuel and air mixture in at least one combustion cylinder using compression ignition prior to the spark ignition; and transitioning ignition of the diesel fuel and air mixture in the plurality of combustion cylinders to only compression ignition.

DETAILED DESCRIPTION OF THE INVENTION

Figure 1:
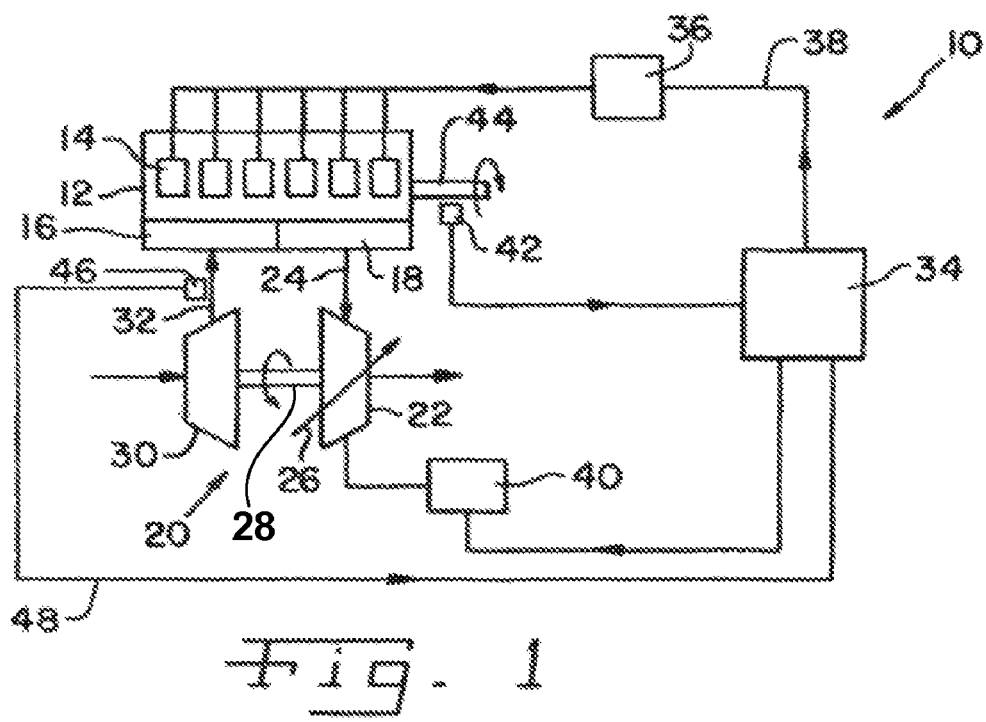
FIG. 1 is a schematic illustration of an IC engine which may be used to carry out an embodiment of the method of operation of an IC engine of the present invention.

Referring now to the drawings, and more particularly to FIG. 1, there is shown an embodiment of an IC engine 10, which may be used to carry out the method of operating an IC engine of the present invention. IC engine 10 generally includes a block 12 defining a plurality of combustion cylinders 14. In the embodiment shown, IC engine 10 includes six combustion cylinders, but may include a different number such as three, four, eight, ten or twelve combustion cylinders, depending upon the application. IC engine 10 also includes an intake manifold 16 and an exhaust manifold 18 coupled with block 12. Intake manifold 16 and exhaust manifold 18 are each in fluid communication with the plurality of combustion cylinders 14, in known manner. A turbocharger 20 includes a variable geometry turbine (VGT) 22 which is rotatably driven by exhaust gas from exhaust manifold 18 via fluid line 24. VGT 22 includes an actuatable element such as a plurality of actuatable turbine vanes or an actuatable orifice for controlling the air flow therethrough, as indicated by diagonal arrow 26.

VGT 22 rotatably drives an output shaft 28, which in turn rotatably drives compressor 30. Compressor 30 receives ambient combustion air, and provides compressed combustion air to intake manifold 16 via fluid line 32. An aftercooler (not shown) may be optionally provided in communication with fluid line 32 between compressor 30 and intake manifold 16 to cool the compressed combustion air which is heated during the compression process.

An electronic controller 34 is coupled with and controls operation of fuel injectors in each combustion cylinder 14. In the embodiment shown, electronic controller 34 is coupled with fuel injectors via electric lines 38. These fuel injectors receive fuel from a fuel tank (not shown) for supplying to combustion cylinders 14.

Electronic controller 34 is also electrically coupled with an actuator 40 for controlling exhaust gas flow through VGT 22 using, e.g., actuatable vanes or an orifice as described above.

Electronic controller 34 receives input signals from an engine speed/crankshaft position sensor 42 associated with crankshaft 44 which is rotatably driven by reciprocating motion of pistons within combustion cylinders 14.

Electronic control 34 is also electrically coupled with an air flow sensor 46 via electric line 48. Air flow sensor 46 senses the air flow rate of compressed combustion air which is introduced at intake manifold 16.

Figure 2:
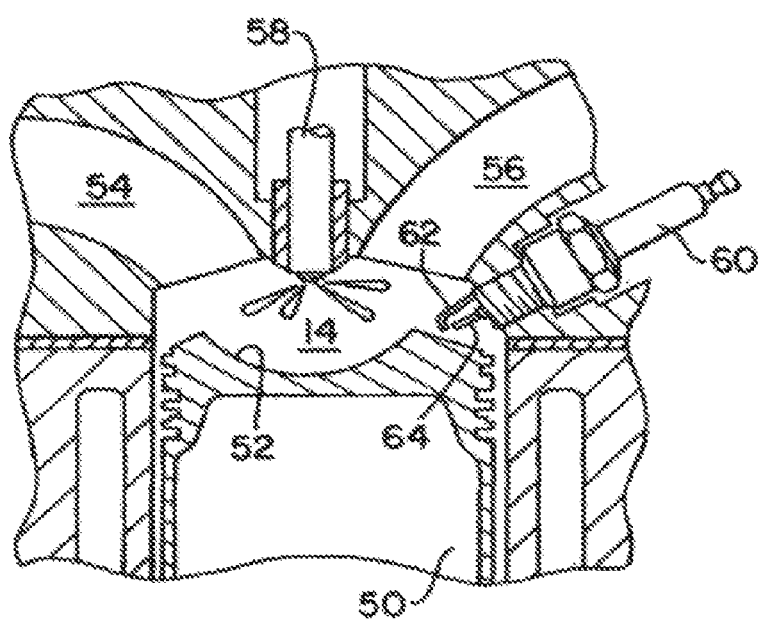
FIG. 2 is fragmentary, sectional view of a combustion cylinder shown in FIG. 1.

FIG. 2 is a fragmentary, sectional view of a combustion cylinder and piston arrangement shown in FIG. 1. Piston 50 is coupled with crankshaft 44 by a connecting rod (not shown) and reciprocates in known manner within combustion cylinder 14 between top dead center (TDC) and bottom dead center (BDC) positions. Piston 50 has a contoured head 52 which assists in HCCI compression ignition during operation. Piston 50 includes a number of piston ring grooves near head 52 which carry respective piston rings (not shown). An intake port 54 is in communication with intake manifold 16, and an exhaust port 56 is in communication with exhaust manifold 18. It will be appreciated that the valves for selectively opening and closing intake port 54 and exhaust port 56 are not shown for simplicity sake. A fuel injector nozzle 58 sprays a selected amount of diesel fuel into combustion cylinder 14 and is combined with combustion air from intake port 54 for ignition and combustion within combustion cylinder 14. The combustion of the fuel and air mixture is ignited through spark ignition using spark plug 60 during warm up periods, and is ignited using compression ignition upon movement of piston 50 to the TDC position after an initial warm up period.

In the embodiment shown, spark plug 60 includes a first electrode 62 and a second electrode 64 spaced apart by a spark gap therebetween. During warm up periods, a spark is generated between first electrode 62 and second electrode 64 as piston 50 is moving toward the TDC position shown in FIG. 2. The spark ignites the fuel and air mixture in combustion cylinder 14. When spark plug 60 is not being used to generate a spark for ignition of the fuel and air mixture, first electrode 62 and second electrode 64 are used at selected points in time as an ionization sensor for sensing ionization of the fuel and air mixture which occurs upon ignition.

Figure 3:
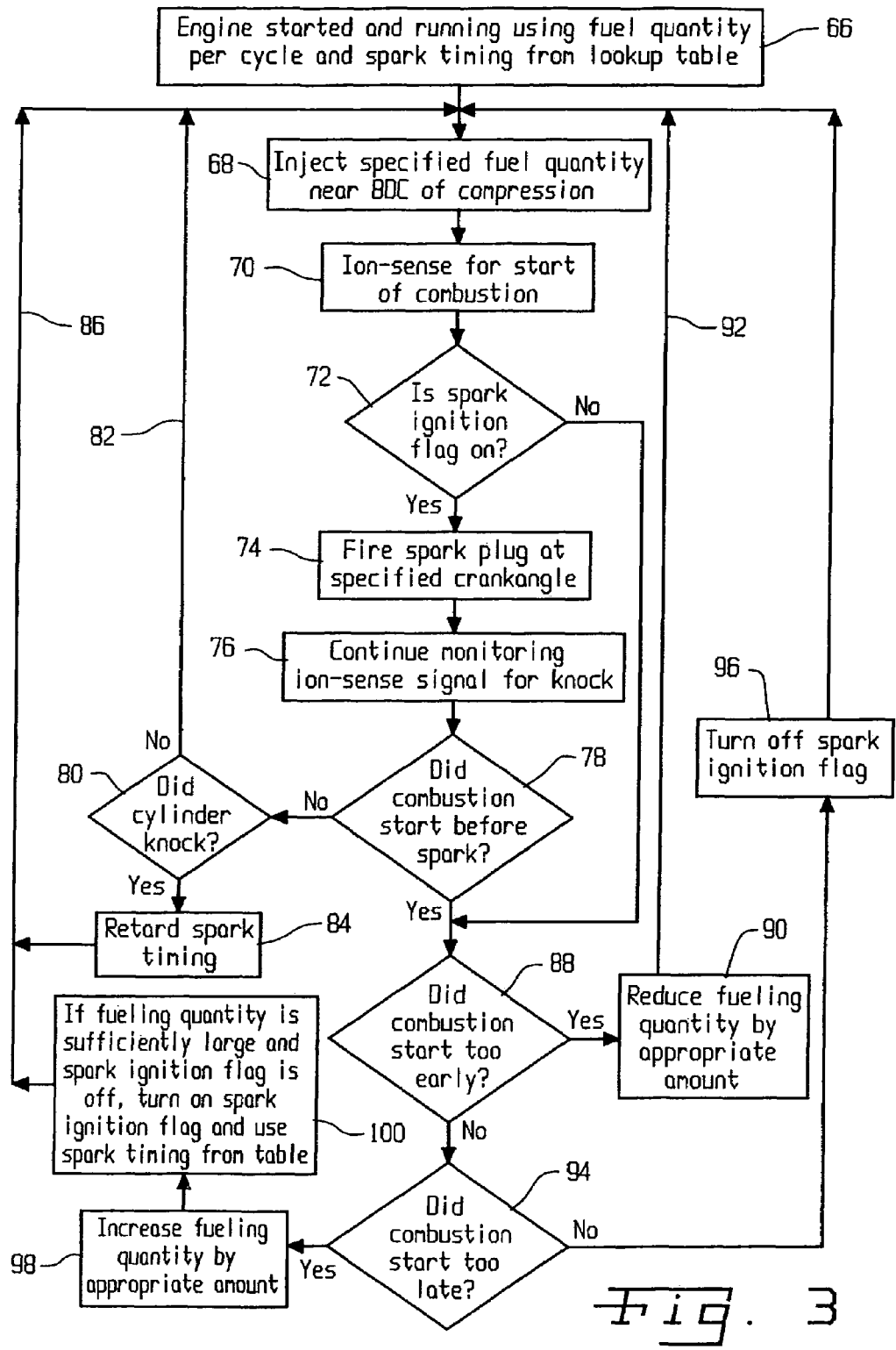
FIG. 3 is a flowchart of an embodiment of the method of operation of an IC engine of the present invention.

Referring now to FIG. 3, there is shown a flow chart of an embodiment of the method of operation of an IC engine of the present invention. In general, the IC engine is assumed to be started at a cold state during which spark ignition of the fuel and air mixture occurs. The spark timing and the fuel injection amount are adjusted as the engine warms up from the cold state to an operating, steady state condition. After initial warm up, compression ignition occurs prior to the spark ignition being initiated, and therefore the spark ignition is no longer used when in a steady state condition after warm up.

At initial start up of the IC engine, the fuel quantity per cycle as well as the spark timing are determined from a lookup table (block 66). The specified quantity of fuel is injected into combustion cylinder 14 when piston 50 is near a BDC position (block 68). During warm up, the fuel and air mixture within combustion cylinder 14 will not ignite upon movement of piston 50 toward the TDC position. First electrode 62 and second electrode 64 of spark plug 60 are used to monitor ionization of the fuel and air mixture within combustion cylinder 14 indicating compression ignition (decision block 70). If compression ignition has not occurred and the spark ignition flag is turned on (decision block 72), then spark plug 60 is fired at a specified crank angle of crank shaft 40 using crank shaft position sensor 42 (block 74). After firing of spark plug 60, electrodes 62 and 64 are again used to monitor for ionization within combustion cylinder 14 to determine if knock has occurred (block 76). If combustion started upon generation of the spark (decision block 78) and the cylinder did not knock (decision block 80) then control loops back to block 68 for the next fuel injection cycle via control line 82. On the other hand, if combustion occurred upon generation of the spark but the cylinder did knock, then the spark ignition timing signal is retarded (block 84) and control loops back to block 68 for the next fuel injection cycle via line 86.

In the event that combustion occurred before generation of the spark using spark plug 60, a determination is made as to whether the combustion initiation was too early in the cycle (decision block 88). If combustion did occur too early, then the injected fuel quantity is reduced an appropriate amount (block 90) and control loops back to block 68 via line 92. On the other hand, if combustion was not too early, then another query is made as to whether combustion was too late in the cycle (decision block 94). If combustion did not occur too late, then the IC engine has warmed up a suitable amount to turn off spark generation using spark plug 60 (block 96) and control loops back to block 68 for the next fuel injection cycle. On the other hand, if combustion did occur to late in the cycle, then the amount of fuel which is injected into the next cycle is increased (block 98). If the spark ignition flag is off, the spark ignition flag is turned on and a spark timing is obtained from a look up table (block 100). Control then loops back to block 68 via line 86.

Figure 4:
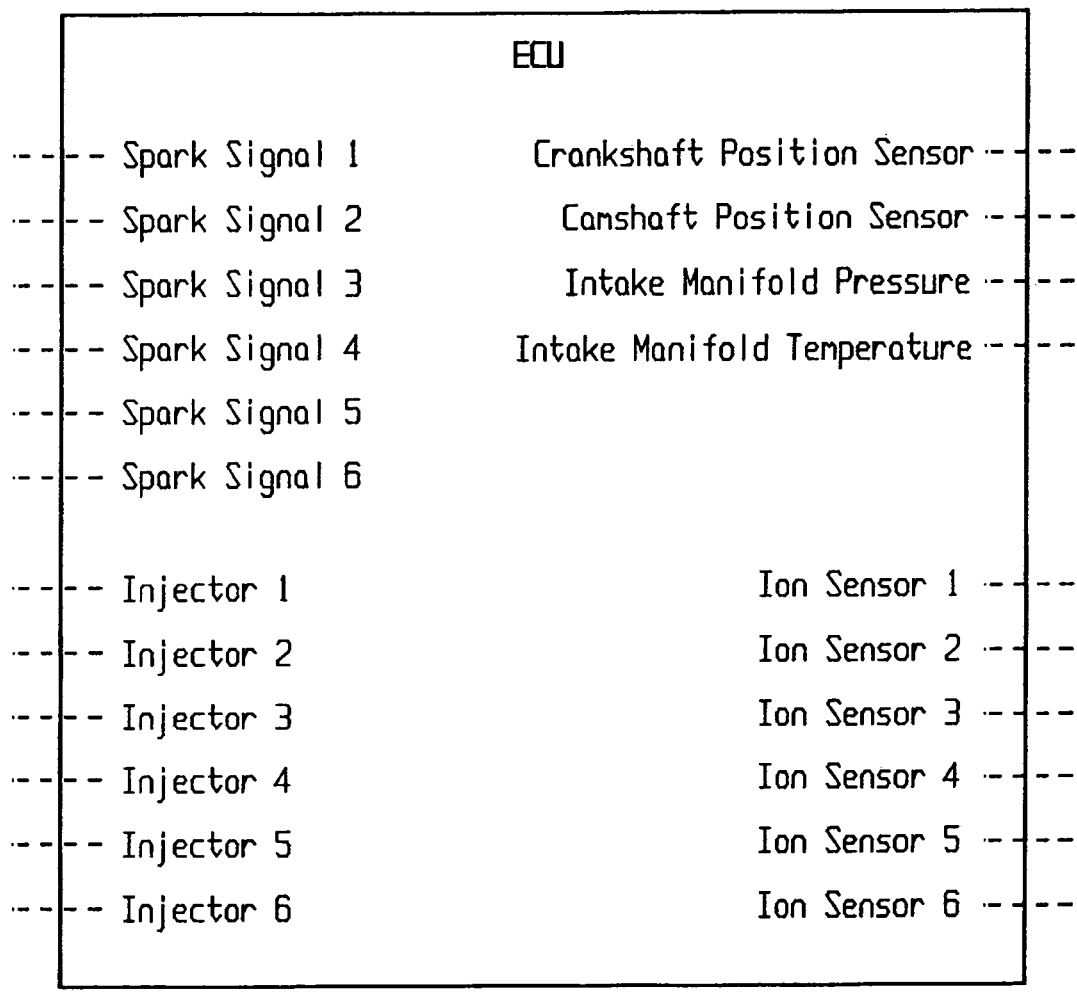
FIG. 4 is a schematic illustration of the input signals to the electronic controller shown in FIG. 1.

FIG. 4 illustrates inputs and outputs for the six cylinder embodiment of IC engine 10 shown in FIG. 1. It should be noted that the spark signals and the ion sensor signals are each generated from the six spark plugs 60 associated with the respective combustion cylinders 14. In addition to the crankshaft position/speed sensor 42 and airflow sensor 46 shown in FIG. 1, it should be noted that other sensors corresponding to the camshaft position, engine air flow rate, intake manifold pressure and/or intake manifold temperature may also optionally be used.

Having described the preferred embodiment, it will become apparent that various modifications can be made without departing from the scope of the invention as defined in the accompanying claims.

The invention claimed is:

1. A method of operating a turbocharged internal combustion engine, comprising the steps of:
   igniting a diesel fuel and air mixture in a combustion cylinder using spark ignition;
   sensing knock in said combustion cylinder using an ionization sensor;
   adjusting a spark timing and a fuel injection amount in said combustion cylinder dependent upon said sensed knock, said adjusting step including adjusting air flow delivered un-throttled from a compressor of a turbocharger to the engine by exclusively adjusting an actuatable element of the turbine of said turbocharger, and said fuel injection amount is adjusted in response to said adjusted air flow; and
   igniting the diesel fuel and air mixture in said combustion cylinder using compression ignition.

2. The method of operating an internal combustion engine of claim 1, including the step of injecting the fuel and air mixture into said combustion cylinder during an intake stroke prior to said spark ignition igniting step.

3. The method of operating an internal combustion engine of claim 1, wherein said first igniting step comprises igniting a stoichiometric fuel and air mixture.

4. The method of operating an internal combustion engine of claim 1, wherein said spark ignition is carried out using a spark plug, and said ionization sensor comprises said spark plug.

5. The method of operating an internal combustion engine of claim 4, wherein said spark plug is used as an ionization sensor when said spark plug is not generating a spark.

6. The method of operating an internal combustion engine of claim 1, wherein said step of sensing knock is carried out using one of said ionization sensor and a pressure sensor positioned within said combustion cylinder.

7. The method of operating an internal combustion engine of claim 1, wherein said turbocharger includes one of a wastegate and a variable geometry turbine, and said adjusting step includes adjusting one of said wastegate and said variable geometry turbine.

8. The method of operating an internal combustion engine of claim 1, wherein said adjusting step includes retarding said spark timing.

9. The method of operating an internal combustion engine of claim 8, wherein said step of retarding said spark timing reduces said knock.

10. The method of operating an internal combustion engine of claim 9, wherein said adjusting step includes leaning the fuel and air mixture.

11. The method of operating an internal combustion engine of claim 1, wherein said compression ignition comprises HCCI ignition.

12. The method of operating an internal combustion engine of claim 1, wherein said internal combustion engine operates under a fuel follows air strategy while operating under said compression ignition.

13. A method of operating turbocharged internal combustion engine, comprising the steps of:
   igniting a diesel fuel and air mixture in a plurality of combustion cylinders using spark ignition;
   sensing knock independently in each said combustion cylinder using an ionization sensor;
   adjusting a spark timing and a fuel injection amount independently in each said combustion cylinder, dependent upon said sensed knock in said corresponding combustion cylinder, said adjusting step including adjusting air flow delivered un-throttled from a compressor of a turbocharger to the engine by exclusively adjusting an actuatable element of the turbine of said turbocharger, and said fuel injection amount being adjusted in response to said adjusted air flow;
   during warmup, sensing compression ignition of the diesel fuel and air mixture in at least one said combustion cylinder prior to said spark ignition; and
   transitioning ignition of the diesel fuel and air mixture in said plurality of combustion cylinders to only compression ignition.

14. The method of operating an internal combustion engine of claim 13, wherein said spark ignition is carried out using a spark plug, and said ionization sensor comprises said spark plug.

15. The method of operating an internal combustion engine of claim 14, wherein said spark plug is used as an ionization sensor when said spark plug is not generating a spark.

16. The method of operating an internal combustion engine of claim 13, wherein said step of sensing knock is carried out using one of said ionization sensor and a pressure sensor positioned within said combustion cylinder.

17. The method of operating an internal combustion engine of claim 13, wherein said turbocharger includes one of a wastegate and a variable geometry turbine, and said adjusting step includes adjusting one of said wastegate and said variable geometry turbine.

18. The method of operating an internal combustion engine of claim 13, wherein said adjusting step includes retarding said spark timing.

19. The method of operating an internal combustion engine of claim 18, wherein said step of retarding said spark timing reduces said knock.

20. The method of operating an internal combustion engine of claim 19, wherein said adjusting step includes leaning the fuel and air mixture.

21. The method of operating an internal combustion engine of claim 13, wherein said compression ignition comprises HCCI ignition.

\* \* \* \* \*